(12) United States Patent
Lin

(10) Patent No.: US 6,282,287 B1
(45) Date of Patent: Aug. 28, 2001

(54) COMMUNICATION EARPIECE WITHOUT IMPULSE AND HIGH FREQUENCY NOISE

(76) Inventor: Chung-Yu Lin, 29, Tunnel 152, Kuang Hwa 1 Rd., Kaoshiung (TW)

( * ) Notice: Subject to any disclaimer, the term of this patent is extended or adjusted under 35 U.S.C. 154(b) by 0 days.

(21) Appl. No.: 09/350,410

(22) Filed: Jul. 6, 1999

(51) Int. Cl.[7] ........................................ H04M 1/00
(52) U.S. Cl. ........................................ 379/433
(58) Field of Search ........................ 379/433, 428; 381/370, 372, 386

(56) References Cited

U.S. PATENT DOCUMENTS 5,729,605 * 3/1998 Bobisuthi et al. ................ 379/433
5,953,414 * 9/1999 Abraham et al. ................ 379/433

* cited by examiner

Primary Examiner—Jack Chiang
(74) Attorney, Agent, or Firm—Raymond Y. Chan; David and Raymond Patent Group

(57) ABSTRACT

A communication earpiece without impulse and high frequency noise, includes an earpiece housing having a chamber and a loudspeaker mounted in the chamber of the earpiece housing, wherein a plurality of sound outlet meshes is provided on a front surface of the earpiece housing. A resonant piece is mounted and encircled around the loudspeaker, wherein two or more peripheral sides of the resonant piece are affixed on an inner surface of the earpiece housing in such a manner that provides at least a passage gap between the inner surface of the earpiece housing and the resonant piece so as to prevent the impulse noise directly impact to the human ear. Besides, the sound, which is reproduced by the interference with two different phases of wave, will reduce the high frequency noise that become more pure and clarity.

3 Claims, 2 Drawing Sheets

US 6,282,287 B1

COMMUNICATION EARPIECE WITHOUT IMPULSE AND HIGH FREQUENCY NOISE

BACKGROUND OF THE PRESENT INVENTION

1. Field of Invention

The present invention relates to an earpiece, and more particularly to a hand set communication earpiece with a loudspeaker inside, wherein sound generated by the loudspeaker of the earpiece does not contain impulse and high frequency noise and the earpiece can also purify and clarify sound.

2. Description of Related Arts

A communication earpiece is used as an energy transformer that the electrical energy of voice will transform into the mechanical energy to a loudspeaker and further transform into sound energy adapted for people hearing. However, the electrical energy of voice is not pure and unique for transformation. It also contains many electrical feedback or noise. This noise after two energy transformations cannot be reduced automatically and will remain in the sound energy at last. It is why the noise of 'beep' sounds often found at high frequency range and the noise of 'woo' sounds often found at low frequency range. An impulse noise is produced during transformation as well. So, the quality of sound will get poor and sometimes user is unable to hear the sound clearly from the earpiece.

Moreover, the above description is one of the causes of the noise emitted from the earpiece. The noise such as noise from the heat conduction by electric circuit and noise from the semi-conductor still cannot be overcome. So, it is impossible to completely reduce the noise in the sound from an ordinary earpiece.

SUMMARY OF THE PRESENT INVENTION

A main object of the present invention is to provide a communication earpiece without impulse and high frequency noise, wherein two different sound waves are generated by the loudspeaker in the earpiece, which overlap with each other to intensify the reproductive resonance at the middle range of frequency (200 Hz~4 kHz) of sound wave. Moreover, the present invention can filter and minimize the noise or feedback at higher and lower frequency range. A high-clarity sound without impulse noise will be produced by the present invention that an ordinary earpiece cannot produce.

Another object of the present invention is to provide a communication earpiece wherein the earpiece must be placed near to the human external ear while using, the lower impulse noise output end according to two output ends of a loudspeaker inside the earpiece is faced toward the human external ear. So, the low impulse noise is received and the direct impact of high impulse noise can be avoided to the human ear. Human ear will have the best protection. Even though the earpiece will generate high impulse noise, this impulse noise to the human ear will diminish as much as possible. People will enjoy a healthy and safety sound generated by the present invention.

DETAILED DESCRIPTION OF THE PREFERRED EMBODIMENT

Figure 1:
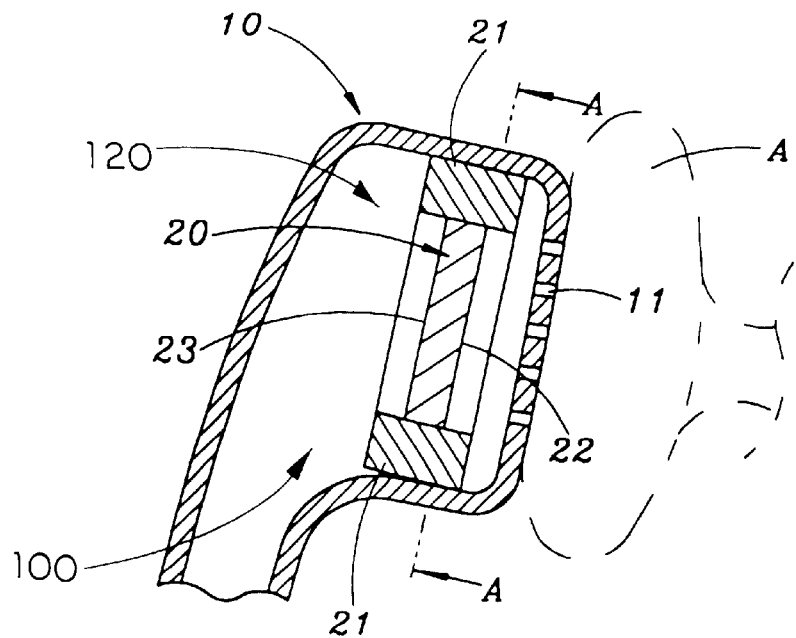
FIG. 1 is a perspective view of a communication earpiece without impulse and high frequency noise according to a preferred embodiment of the present invention.
Figure 2:
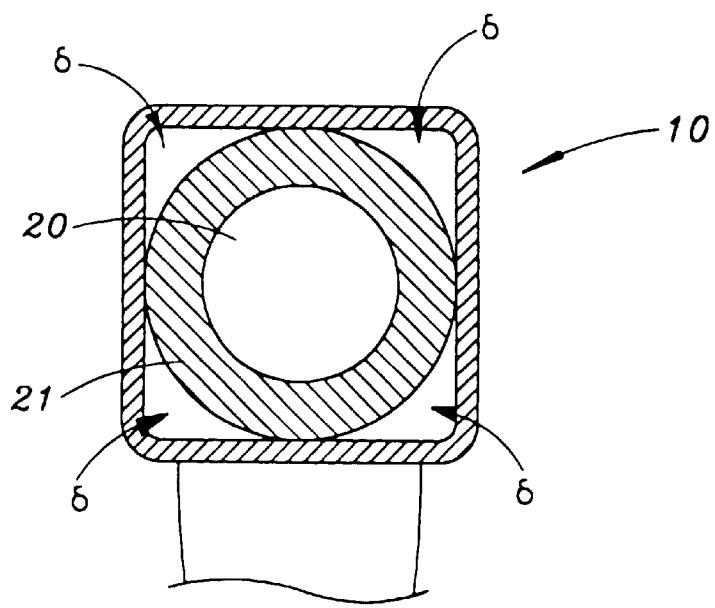
FIG. 2 is a perspective view of FIG. 1 according to cutaway line A—A.

Referring to FIGS. 1 and 2 of the drawings, the present invention comprises an earpiece housing 10 having a chamber 100 therein and a loudspeaker 20 mounted in the chamber of the earpiece housing 10, wherein a plurality of sound outlet meshes 11 is provided on a front surface of the earpiece housing 10 adapted for hanging on the human ear A. A resonant piece 21 is mounted and encircled around the loudspeaker 20. Two or more peripheral sides of the resonant piece 21 are affixed to an inner surface of the earpiece housing 10 so as to mount the loudspeaker 20 in the chamber 100 and divide the chamber 100 into a front chamber 101 and a rear chamber 102. The loudspeaker 20 has a low intensive impulse noise output end 22 facing to the front chamber 101 and the sound outlet meshes 11 of the earpiece housing 10, wherein the low intensive impulse noise output end 22 is preferred to be arranged close to the sound outlet meshes 11 of the earpiece housing 10, and a high intensive impulse noise output end 23 facing the rear chamber 102, that is far from the sound outlet meshes 11 of the earpiece housing 10.

Referring to FIGS. 1 and 2, while the present invention is hanged on the human ear A for listening music or hearing voice, the low intensive impulse and pressure sound wave, which emitted from the low impulse noise output end 22, is transmitted to the sound outlet meshes 11 of the earpiece housing 10. This sound wave does not contain any high intensive impulse noise so that the human ear will not be hurt by the impact of sudden rise of the high intensive impulse noise. At least a passage gap 8 is provided between the earpiece housing 10 and the resonant piece 21. According to the preferred embodiment, four passage gaps δ are provided at four corners of the cubical earpiece housing 10 while the circular resonant piece 21 is mounted thereon. The high-pressure sound wave, which is produced by the high impulse noise output end 23 and emitted to the rear chamber 102, will transmit through the passage gaps 8 into the front chamber 101 and meet the low-pressure sound wave emitted from the low impulse noise output end 22 in the front chamber 101. The energy of high intensive sound wave will diminish as much as possible during its pathway. The two different, high and low, intensive sound waves will then interfere with each other in the front chamber 101. The frequency response will increase, that is the sum of the amplitudes, when two waves are in phase (the difference of two phases is even integral multiple of 360 degree). Contrarily, the frequency response will decrease, that is the difference of the amplitudes, when two waves are out of phase (the difference of two phases is odd integral multiple of 180 degree). By means of the specifically designed resonant piece 21 encircling the loudspeaker 20, the wave after the interference is reproduced. The middle pitch of the sound frequency (200 Hz~4 kHz) will be increased and the high pitch of the sound frequency will be decreased, so as to achieve a high quality of sound interval which is a combination of waves without the high frequency of noise. Furthermore, the resonant piece 21 can be affixed on the earpiece housing by screwing, clipping, assembly, or adhesion.

Figure 3:
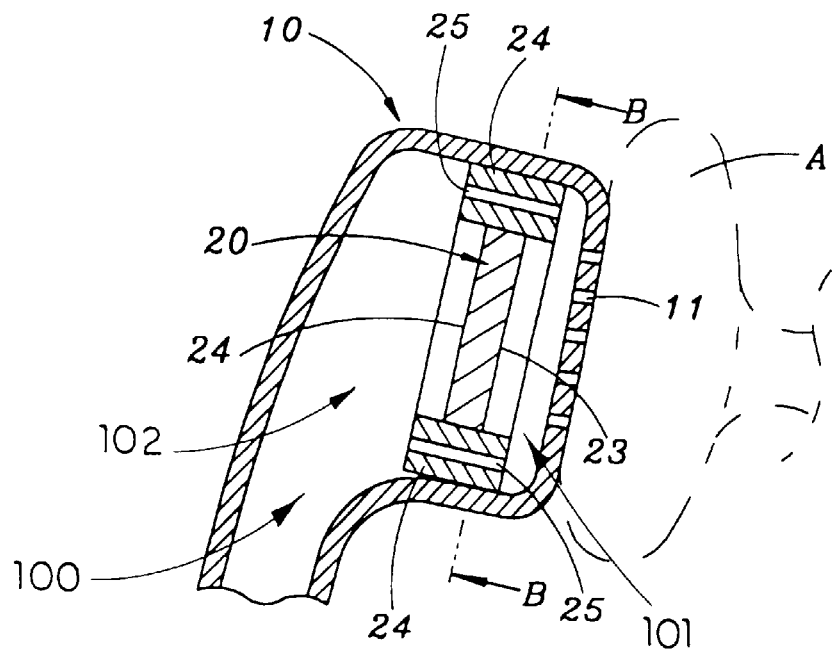
FIG. 3 is a perspective view of a communication earpiece without impulse and high frequency noise according to the housing of another embodiment of the present invention.
Figure 4:
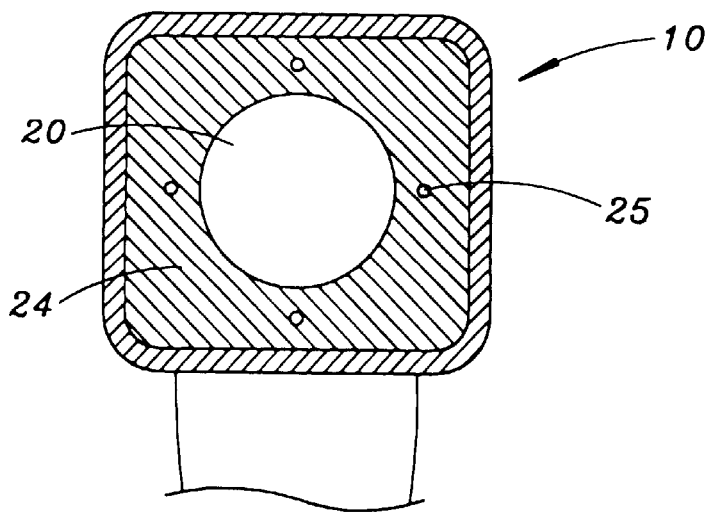
FIG. 4 is a perspective view of FIG. 3 according to cutaway line B—B.

Referring to FIGS. 3 and 4 of the drawings, according to another example of the above embodiment of the present invention, the outer resonant piece 24 is fittedly affixed to the inner surface of the earpiece housing 10, i.e. no gap is formed. Therefore, a plurality of passage meshes 25 is longitudinally provided on the resonant piece 24 in a proper location so as to form a passway between the front chamber 101 and the rear chamber 102. Thereof the wave produced by the high impulse noise output end 23 will transmit through the passage meshes 25 and meet the wave produced by the low impulse noise output end 22 in the front chamber 101. A sound is reproduced after two waves interfere with each other and this sound from the earpiece will not contain impulse and high frequency noise.

What is claimed is:

1. A communication earpiece, comprising:

an earpiece housing having a chamber therein, wherein a plurality of sound outlet meshes is provided on a front surface of said earpiece housing;

a loudspeaker, which is mounted in said chamber of said earpiece housing, having a low intensive impulse noise output end and a high intensive impulse noise output end; and a resonant piece, which is mounted and encircled around said loudspeaker, having two or more peripheral sides thereof said resonant piece affixed to an inner surface of said earpiece housing so as to mount said loudspeaker in said chamber and divide said chamber into a front chamber and a rear chamber and render said lower intensive impulse noise output end of said loudspeaker facing to said front chamber and said high intensive impulse noise output end facing said rear chamber, therefore said low intensive impulse noise output end is closer to said sound outlet meshes of said earpiece housing than said high intensive impulse noise output end, wherein a cross section of said resonant piece is different to a cross section of said chamber of said earpiece housing so as to provide at least a passage gap between said inner surface of said earpiece housing and said resonant piece that enables a high intensive and pressure sound wave emitted from said high impulse noise output end into said rear chamber to transmit through said passage gaps into said front chamber and meet a low intensive and pressure sound wave emitted from said low intensive impulse noise output end in said front chamber, thereby said high and low intensive and pressure sound waves interfere with each other in said front chamber wherein a frequency response increases when said high and low intensive and pressure sound waves are in phase and said frequency response decreases when said high and low intensive and pressure sound waves are out of phase.

2. The communication earpiece, as recited in claim 1, wherein said chamber of said earpiece housing has a square cross section and said resonant piece has a circular cross section, wherein a diameter of said resonant piece is equal to a side of said chamber of said earpiece housing, so as to fittingly mount said resonant piece inside said earpiece housing and provide four passage gaps at four interior corner of said chamber of said earpiece housing.

3. A communication earpiece, comprising:

an earpiece housing having a chamber therein, wherein a plurality of sound outlet meshes is provided on a front surface of said earpiece housing;

a loudspeaker, which is mounted in said chamber of said earpiece housing, having a low intensive impulse noise output end and a high intensive impulse noise output end; and a resonant piece, which is mounted and encircled around said loudspeaker, having a peripheral side fittingly affixed to an inner surface of said earpiece housing so as to mount said loudspeaker in said chamber and divide said chamber into a front chamber and a rear chamber and render said lower intensive impulse noise output end of said loudspeaker facing to said front chamber and said high intensive impulse noise output end facing said rear chamber, therefore said low intensive impulse noise output end is closer to said sound outlet meshes of said earpiece housing than said high intensive impulse noise output end, wherein a plurality of passage meshes is longitudinally provided on said resonant piece in order to form a passway between said front chamber and said rear chamber, so as to enable a high intensive and pressure sound wave emitted from said high impulse noise output end into said rear chamber to transmit through said passage meshes into said front chamber and meet a low intensive and pressure sound wave emitted from said low intensive impulse noise output end in said front chamber, thereby said high and low intensive and pressure sound waves interfere with each other in said front chamber wherein a frequency response increases when said high and low intensive and pressure sound waves are in phase and said frequency response decreases when said high and low intensive and pressure sound waves are out of phase.

* * * * *